Patented June 15, 1954

2,681,352

UNITED STATES PATENT OFFICE 2,681,352

PREPARATION OF ALKALI METAL SALTS OF GLUCURONIC ACID FROM GLUCURONOLACTONE

William Hach, Oak Park, and Donald G. Benjamin, Maywood, Ill., assignors to Corn Products Refining Company, New York, N. Y., a corporation of New Jersey No Drawing. Application October 30, 1951, Serial No. 253,982

4 Claims. (Cl. 260—345.7)

This invention relates to the preparation of pure salts of glucuronic acid, particularly the alkali metal salts. These salts have been difficult of access heretofore, due to lack of a source of glucuronic acid. Quite recently glucuronic acid has become available, not as free glucuronic acid but as glucuronolactone, no practical method having been found for obtaining pure glucuronic acid directly. Theoretically, all that is necessary in order to obtain salts of glucuronic acid from glucuronolactone is to hydrolyze the lactone ring therein and neutralize the resulting glucuronic acid with a base containing the desired cation. Since hydrolysis and neutralization occur simultaneously when hydrolysis is carried out in the presence of a base, the reaction may be written as follows:

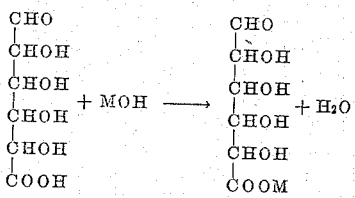

Glucuronolactone, however, is subject to attack by alkali in at least two ways: first, contact with alkali causes rapid degradation and color formation similar to that which occurs with glucose as a result of attack on the aldehyde function, and second, contact with alkali also causes hydrolysis of the lactone ring to form the salt. The latter is the desired reaction in making salts of glucuronic acid but because of the former reaction it has been difficult to obtain good yields of pure alkali metal salts of glucuronic acid from glucuronolactone.

It would appear obvious to those skilled in the art that degradation resulting from attack on the aldehyde function could only be avoided by adding the base used for hydrolysis no faster than it is consumed in the neutralization reaction, so that high pH levels cannot develop. However, hydrolysis of glucuronolactone proceeds very slowly at pH levels below neutrality and when, for example, potassium hydroxide is added to a solution of glucuronolactone the pH level rises above 7 almost immediately. In order to cause the reaction to proceed at a reasonably practical rate, alkali must be added at a rate such that a pH level somewhat above 7 is maintained in the system. Even if the alkali is added sufficiently slowly that the pH level never rises above about 8, the reaction proceeds so slowly that by the time the required amount of alkali has been added the solution has become quite dark in color and a substantial amount of glucuronic acid has been destroyed. When such high color is developed, it cannot be removed efficiently with activated carbon and yields of satisfactory quality product from such liquors are disappointingly low. Carrying out the reaction at somewhat elevated temperature allows the operation to be completed in shorter time, but rate of alkaline degradation also increases with increasing temperature so that little advantage is gained.

Glucuronic acid itself will react readily with a base to form a salt, and alkaline pH levels do not develop in the system until substantially all the required amount of alkali has been added. Therefore, solutions of pure glucuronic acid can be neutralized with bases in the customary manner to produce good yields of the corresponding salts. As already stated, however, known processes for obtaining glucuronic acid result in glucuronolactone rather than glucuronic acid, or at least in mixtures containing relatively large amounts of the lactone. Consequently, no matter how carefully available materials are treated with alkaline reagents in the manner customarily used to prepare salts, prolonged reaction times are required, alkaline pH levels cannot be avoided, and colored products and low yields result.

Aqueous solutions of glucuronolactone tend to revert to equilibrium mixtures of glucuronolactone and glucuronic acid on standing. At ordinary temperatures several weeks are required for equilibrium to be established and the mixture then contains 60 to 70 per cent free glucuronic acid. Such solutions will consume rapidly 60 to 70 per cent of the required alkali to make the corresponding salt, without developing alkaline pH levels but, when alkali addition is continued to convert the remaining lactone to salt, essentially the same difficulties arise (i. e., slow reaction and color formation) as if the solution had not been allowed to equilibrate. In any event the time required to permit establishment of the initial equilibrium makes such a procedure impractical.

The time required for solutions of glucuronolactone to become equilibrated can be shortened substantially by increasing the temperature, but glucuronolactone solutions equilibrated at higher temperatures contain decreasing amounts of free glucuronic acid as temperature is increased. Thus, if glucuronolactone is dissolved in water and the solution is heated at 100° C. equilibrium is established within a few hours, but the solution then contains only about 30 per cent free acid, so no advantage is gained. Mineral acids act as catalysts in hastening establishment of equilibrium in solutions of glucuronolactone, without affecting the composition of the equilibrium mixture as far as glucuronolactone and glucuronic acid are concerned. However, solutions allowed to equilibrate in this way exhibit the same behavior during neutralization as when no mineral acid is employed and, in addition, the presence of mineral acid gives rise to inorganic salt upon neutralization and this results in contaminated products.

We have found that little improvement is realized from the standpoint of color formation or yield by employing milder alkalies, such as sodium or potassium bicarbonate, in place of the corresponding hydroxides for neutralizing solutions containing glucuronolactone. Thus, none of the conventional methods for preparing salts from acids or their lactones produces high yields of a satisfactory product when applied to solutions of glucuronolactone.

It is an object of the present invention to provide a new and improved method for preparing pure salts of glucuronic acid. It is a further object to provide a method of preparing pure alkali metal salts of glucuronic acid. A further object is to provide a method of preparing pure salts of glucuronic acid in high yield from glucuronolactone. Other objects will appear hereinafter.

Our invention, in general, comprises rapidly and intimately contacting essentially chemically equivalent amounts of glucuronolactone and the appropriate alkali metal hydroxide under controlled conditions of temperature and preferably controlled conditions of concentration to permit most economic recovery, to produce salts of glucuronic acid.

Our invention lies in our discovery that, in spite of the fact that glucuronolactone hydrolyzes very slowly at pH levels below neutrality whereas it is destroyed rapidly at pH levels above neutrality, nevertheless high yields of pure alkali metal salts of glucuronic acid can be prepared from glucuronolactone and the appropriate alkali metal hydroxide when these are allowed to react quickly under controlled conditions.

While order of addition of the reactant bases and acids usually is unimportant in reactions leading to salt formation, in this particular case it would appear obvious to those skilled in the art that addition of a solution of glucuronolactone to one containing the required amount of alkali, although resulting in hydrolysis of the lactone and neutralization of the resulting glucuronic acid, would cause inordinate destruction of the aldehydic compound because of the large excess of alkali present in the initial stages of the reaction. Quite unexpectedly, however, we discovered that when dry glucuronolactone was added rapidly and with agitation to a solution containing the theoretically required amount of sodium or potassium hydroxide exceptionally high yields of pure sodium or potassium glucuronate could be recovered from the reaction mixtures. Equally satisfactory results were obtained when glucuronolactone was dissolved in water and added to a solution containing the theoretically required amount of sodium or potassium hydroxide, or the solutions could be mixed in reverse order, provided in all cases the reactants were brought together very rapidly. Thus, unexpectedly, we discovered that the time allowed for reaction was a far more effective variable than concentration of reactants, reaction temperature, or even pH level, when the latter variables were controlled within reasonable limits, in affecting the yield and quality of product attainable. Concentration of reactants and reaction temperatures are not critical and relatively high pH levels can be tolerated, provided the period of time the mixture remains on the alkaline side of neutrality is minimal. Although high pH levels do result temporarily when equivalent amounts of the reactants are mixed together quickly, the hydrolysis and neutralization reactions proceed rapidly under these conditions even at low temperatures. But particularly if the amount of glucuronolactone employed represents a slight excess over the alkali, the pH of the mixture drops quickly to neutrality or below as a result of the neutralization so that little alkaline degradation or color formation occurs under these conditions unless excessively high temperatures are employed or allowed to develop. Unduly high temperatures favor these adverse reactions and we have found that temperatures in excess of 70 to 90° F. should be avoided during the reaction itself for best results. This places some limitations on practical concentrations of reactants since all neutralization reactions are exothermic and temperature control becomes difficult if reactants are employed in highly concentrated form as will be readily apparent to those familiar with the art.

The time required for mixing the glucuronolactone and alkali metal hydroxide is the most critical factor in carrying out our invention and should be as short as possible. The time should preferably not exceed 5 minutes, but it may be as long as 10 minutes. Longer times result in increased color formation, greater destruction of glucuronic acid and, consequently in smaller yields and colored products.

The system should be subjected to efficient agitation during the mixing operation so that intimate contact of the reactants is maintained.

The preferred temperature for carrying out the reaction is about 70 to 90° F. but temperatures as high as 110–130° F. may be used.

No more than the chemically equivalent amount of alkali metal hydroxide should be added. Preferably the ratio of alkali metal hydroxide to glucuronolactone should be 0.9 mole of the former to 1 mole of the latter.

We have discovered that further advantage leading to improved yields of high quality product may be realized by choosing concentrations of reactants such that a large portion of the salt formed will crystallize after the reaction is complete without concentrating the reaction mixture, and that the amount recovered in this manner may be further increased if a suitable amount of methanol or some other organic solvent is incorporated in the reaction system to decrease the solubility of the salt therein; aqueous methanol may be employed as solvent for either or both of the reactants, or methanol may be added to the reaction mixture following combination of the aqueous reactants. Since the crude glucuronolactone usually employed as one of the reactants contains some color and some color develops during the reaction in any case, carbon treatment is beneficial. We, therefore, prefer to bring the aqueous reactants together and then add carbon, hold the mixture for a sufficient time to accomplish decolorization at a temperature such that the salt will not crystallize, then remove the carbon and add the proper amount of methanol and allow the salt to crystallize. The carbon treatment may be carried out at temperatures as high as 130° F. since the alkali metal hydroxide has been consumed in the reaction and the effect of high temperatures is much less at neutral or slightly acidic pH levels.

The alkali metal salts of glucuronic acid prepared by the process of our invention are essentially pure white and do not require recrystallization. It is essential for highest yield and pure white product that the reaction and isolation operations be carried out as rapidly as possible. If dilute solutions containing the proper amounts of reactants are brought together rapidly little color develops during the reaction, but the time required to concentrate the resulting mixture to a point where the salt will crystallize is detrimental from the standpoint of color development unless temperature during the concentration operation is maintained at levels below those economical for commercial operation. Carrying out the reaction in a medium such that a maximum first crop of crystals is produced therefore has particular advantage in our process. While additional crops can be recovered from mother liquors, this involves evaporation and accompanying color development, so that the greater the first crop yield the higher will be the final overall recovery of high quality product. On the other hand, the final reaction mixture should not be so concentrated that the salt will crystallize before decolorizing carbon can be removed, or that color carries down with the crystals.

Pure potassium or pure sodium glucuronate can be prepared from glucuronolactone in yields of 85 to 95 per cent by our process. The former crystallizes as the dihydrate and the latter as the monohydrate. Preferred procedures for preparing the two salts differ slightly because of their differing solubilites, sodium glucuronate being substantially more soluble than potassium glucuronate.

In order to attain the above mentioned advantage of maximum first crop yield without the necessity of concentrating the reaction mixture, the amount of water for 0.9 mole of alkali metal hydroxide and 1 mole of glucuronolactone should be within the range of 25 to 75, and preferably 55, moles when potassium hydroxide is the alkali metal hydroxide, and within the range of 25 to 50, and preferably 35, when sodium hydroxide is the alkali metal hydroxide.

The amount of methanol used in recovering the potassium salt should be about 20 to 40, and preferably 30, per cent on a volume basis of the solution obtained from the reaction and for recovering the sodium salt 35 to 55, and preferably 45, per cent.

Ammonium glucuronate cannot be prepared by our process, probably due to the well known fact that ammonia reacts with carbohydrates containing aldehyde groups to form compounds of the glucosylamine type. The glucuronolactone employed in our process does not need to be specially purified; crude glucuronolactone is entirely satisfactory.

The following examples, which are intended as informative and typical and not in a limiting sense, will further illustrate the invention.

EXAMPLE I

*Preparation of potassium glucuronate dihydrate*

One hundred and ninety grams (1.08 moles) of crude crystalline glucuronolactone was dumped instantaneously into one liter of cool (60° F.) 1 N potassium hydroxide (1 mole) containing 2 g. of activated carbon and stirred rapidly until the pH level dropped below about 8.5. The reaction mixture was then warmed to 120° F. and held at that temperature for 30 minutes with constant agitation. It was then filtered, the carbon cake was washed with 50 ml. water, and 450 ml. of methanol was added to the combined filtrate and wash. After 16 hours at room temperature the crystalline potassium glucuronate dihydrate which had formed was filtered off and washed with 190 ml. of 60/40 methanol/water solution. The dried crystals weighed 209 g.

The combined mother liquor and wash was concentrated under reduced pressure to 20° Baumé, and 50 ml. methanol was added. After 16 hours a second crop of crystals was isolated—weight, 42 g. The overall yield of pure white potassium glucuronate dihydrate was thus 94 per cent calculated on the basis that only one mole of alkali had been used in the reaction.

EXAMPLE II

*Preparation of sodium glucuronate monohydrate*

Crude crystalline glucuronolactone (190 g., 1.08 moles) was dumped instantaneously into 600 ml. of cool (60° F.) 1.67 N sodium hydroxide (1.0 mole) containing 2 g. activated carbon. The mixture was stirred rapidly until the pH level dropped below about 8.5, then warmed to 120° F. and agitated for 30 minutes, filtered, the carbon cake rinsed with 50 ml. water, and 650 ml. methanol was added to the combined filtrate and rinse. After 16 hours a crop of crystalline sodium glucuronate monohydrate was removed by filtration and washed with 190 ml. of 80/20 methanol/water solution. The dried crystals weighed 170 g.

The combined mother liquor and wash was concentrated to 25° Baumé under reduced pressure and 125 ml. methanol was added. After 16 hours a second crop of crystals was isolated by filtration and washed with 90 ml. of 80/20 methanol/water solution. The overall yield of pure white sodium glucuronate monohydrate was thus 200 g., or 86 per cent calculated on basis that only one mole of alkali had been used in the reaction.

EXAMPLE III

*Preparation of potassium glucoronate by titration of glucuronolactone solution with alkali at less than 7.0 pH*

In this experiment 176 g. of recrystallized glucuronolactone was dissolved in 500 ml. of water at 140° F. and 2 N potassium hydroxide was added dropwise with constant agitation at a rate such that the pH value of the reaction mixture was never greater than 7.0. Toward the end of the neutralization 4 g. of activated carbon was added. Considerable color developed during the neutralization which required 2 hours. Three successive crops of potassium glucuronate dihydrate were isolated by concentration of the filtered product for an overall yield of 82 per cent. The third crop was off color, however, and yield of acceptable potassium glucuronate dihydrate was only 73 per cent. This yield does not compare favorably with those obtained by the methods described in Examples I and II.

EXAMPLE IV

*Preparation of potassium glucuronate in the presence of methanol*

Potassium glucuronate was prepared by rapid addition (instantaneously) of 18.5 g. dry glucuronolactone to 100 ml. portions of 1 N potassium hydroxide made up with different amounts of water and methanol. The products were allowed to crystallize with no intermediate concentration step. First crop yield and quality of product potassium glucuoronate dihydrate are given in Table I. It is clear that too much methanol results in an inferior product and too little methanol reduces first crop yield. Solvents other than methanol such as acetone and ethanol may be substituted.

TABLE I.—VARYING METHANOL-WATER RATIO IN CRYSTALLIZATION OF POTASSIUM GLUCURONATE DIHYDRATE

[18.5 g. glucuronolactone ÷ 100 ml. of 1 N KOH at 70° F.]

| Volume of Solvent (ml.) | | Crystalline Yield After 24 Hours (g.) | Color of 5% Solution of Crystals (O. D.) [1] |
|---|---|---|---|
| Methanol | Water | | |
| 75 | 25 | Product thrown out as a syrup | |
| 60 | 40 | 24.1 | 7.2 |
| 50 | 50 | 23.6 | 2.5 |
| 40 | 60 | 23.6 | 1.6 |
| 30 | 70 | 22.8 | 0.96 |
| 20 | 80 | 21.0 | 0.60 |
| 10 | 90 | 18.2 | 0.68 |
| 0 | 100 | 13.4 | 0.56 |

[1] As used herein and hereinafter the term "O. D." means optical density (160 cm.) at 450 mµ minus optical density (160 cm.) at 650 mµ. This represents essentially a measurement of yellow and red color.

EXAMPLE V

*Preparation of potassium glucuronate with different potassium hydroxide concentrations*

In this experiment six samples of 6.6 g. of 85 per cent potassium hydroxide were dissolved in the following amounts of water: (1) 25 ml., (2) 25 ml., (3) 50 ml., (4) 75 ml., (5) 100 ml., (6) 200 ml. The first solution was cooled to 15° F. before addition of glucuronolactone, and the other five were cooled to 70° F. Then 18.5 g. of crystalline glucuronolactone was added instantaneously and stirred rapidly into each solution and the temperature rise and color formation noted in each case. Results appear in Table II. It is evident that raising alkali concentration above about 1.5 N causes increased color, and lowering the initial temperature of the alkali solution, thereby restricting the temperature rise during the reaction, only partially obviates this effect.

TABLE II.—EFFECT OF ALKALI CONCENTRATION IN THE PREPARATION OF POTASSIUM GLUCURONATE

[18.5 g.glucuronolactone ÷ 6.6 g. 85% KOH]

| | Water Used In KOH (ml.) | Initial Temperature (° F.) | Final Temperature (° F.) | Order of Increasing Color (diluted to 250 ml.) |
|---|---|---|---|---|
| 1 | 25 | 15 | 90 | 3— dark yellow. |
| 2 | 25 | 70 | 140 | 4—dark red-brown. |
| 3 | 50 | 70 | 106 | 2—yellow. |
| 4 | 75 | 70 | 96 | 1 ⎫ |
| 5 | 100 | 70 | 90 | 1 ⎬ very light yellow |
| 6 | 200 | 70 | 80 | 1 ⎭ |

EXAMPLE VI

*Preparation of potassium glucuronate with different stoichiometric ratios of glucuronolactone and potassium hydroxide*

When exact stoichiometric equivalents of potassium hydroxide and glucuronolactone are combined the final pH value is above 7.0 and degradation of the product occurs in solution. The data in Table III are from an experiment in which different amounts of glucuronolactone were stirred rapidly into 70 ml. of 1.48 N potassium hydroxide followed by addition of 30 ml. methanol. Color of first crystals appears acceptable at a 6 per cent excess of glucuronolactone over alkali, where pH value dropped to below 8.0 after 20 minutes. Greater excesses of lactone do not increase the yield and are therefore uneconomical.

TABLE III.—EFFECT OF STOICHIOMETRIC EXCESS OF GLUCURONOLACTONE IN THE PREPARATION OF POTASSIUM GLUCURONATE

| Stoichiometric Excess Lactone, Percent | pH Value of Reaction Mixture | | | Color of 5% Solution of Crystals, O. D. |
|---|---|---|---|---|
| | 2 min. | 20 min. | 24 hr. | |
| −4 | 12.7 | 12.5 | 11.6 | 0.92 |
| 1 | 10.3 | 9.7 | 8.8 | .72 |
| 6 | 9.2 | 7.8 | 7.4 | .36 |
| 15 | 8.5 | 7.5 | 6.1 | .28 |
| 34 | 8.0 | 7.0 | 5.4 | .28 |

EXAMPLE VII

*Preparation of potassium glucuronate with order, form, and rate of combination of reactants varied*

The effects of (1) order of combination of reactants, (2) addition of glucuronolactone in crystalline form or in solution, and (3) rate of addition of glucuronolactone, are shown in Table IV from the standpoint of color formation, which is directly related to yield and quality of product.

TABLE IV.—EFFECT OF ORDER, FORM, AND RATE OF COMBINATION OF REACTANTS ON COLOR FORMATION IN PREPARATION OF POTASSIUM GLUCURONATE

[Products diluted to 250 ml. for color determination]

| | 1 | | 2 | | Order of Addition | Rate of Addition | Color, O. D. |
|---|---|---|---|---|---|---|---|
| | Lactone (g.) | H₂O (ml.) | 85% KOH (g.) | H₂O (ml.) | | | |
| 1 | 18.5 (0.105 mole) | 60 | 6.6 (0.100 mole) | 10 | 1 into 2 | 5 sec | 34.9 |
| 2 | 18.5 | none | 6.6 | 70 | do | 5 sec | 28.6 |
| 3 | 18.5 | do | 6.6 | 140 | do | 5 sec | 11.4 |
| 4 | 18.5 | do | 6.6 | 210 | do | 5 sec | 10.4 |
| 5 | 18.5 | do | 6.6 | 70 | do | 5 sec | 12.2 |
| 6 | 18.5 | 70 | 6.6 | 70 | do | 7 min | 44.3 |
| 7 | 18.5 | 70 | 6.6 | 70 | 2 into 1 | 5 sec | 16.8 |
| 8 | 18.5 | 70 | 6.6 | 70 | do | 7 min | 38.4 |
| 9 | 18.5 | 70 | 6.6 | 140 | 1 into 2 | 5 sec | 9.8 |
| 10 | 18.5 | 70 | 6.6 | 140 | do | 7 min | 48.3 |
| 11 | 18.5 | 70 | 6.6 | 140 | 2 into 1 | 5 sec | 11.4 |
| 12 | 18.5 | 70 | 6.6 | 140 | do | 7 min | 26.0 |

It is clear from the data in Table IV that of the three variables discussed thus far, rate of combination of reactants is the most critical. High colors result both when glucuronolactone solution is slowly added to alkali and vice versa.

Order of combination of reactants is not critical when mixing is rapid, but comparing test 10 to 12 it appears that when substantial time is required for mixing it is better to add the alkali solution to the lactone solution so that an excess of alkalinity prevails for the shortest possible time.

The data demonstrate that dry and dissolved glucuronolactone serve equally well for the reaction when mixing is rapid.

EXAMPLE VIII

*Preparation of sodium glucuronate with variable methanol-water ratio*

Sixty milliliter portions of 1.67 N sodium hydroxide solutions were made up with graded proportions of methanol and water and 18.5 g. glucuronolactone was stirred rapidly into each. Data appear in Table V.

TABLE V.—VARIABLE METHANOL-WATER RATIO IN CRYSTALLIZATION OF SODIUM GLUCURONATE MONOHYDRATE

[18.5 g. glucuronolactone + 60 ml. 1.67 N sodium hydroxide at 70° F.]

|   | Methanol (ml.) | Water (ml.) | Reaction pH (72 hr.) | Yield (g.) | 5% Soln. Crystals, Color, O. D. |
|---|---|---|---|---|---|
| 1 | 50 | 10 | 8.8 | hygroscopic precipitate. | |
| 2 | 40 | 20 | 9.2 | syrup | |
| 3 | 35 | 25 | 9.2 | 19.8 | 19.7 |
| 4 | 30 | 30 | 8.8 | 19.0 | 0.52 |
| 5 | 25 | 35 | 8.3 | 18.3 | 0.32 |
| 6 | 20 | 40 | 7.8 | 13.4 | 0.24 |

These data show that too much methanol throws out syrup or inferior crystals and too little lowers first crop recovery. A 50–50 ratio is acceptable.

EXAMPLE IX

*Preparation of sodium glucuronate with variable sodium hydroxide concentrations*

Five solutions of sodium hydroxide were made up in water to concentrations of 1.0, 1.25, 1.67, 2.50, and 5.00 N, and a 5 per cent stoichiometric excess of glucuronolactone was stirred rapidly into each. Color formation was excessive at the two highest alkali concentrations, but was substantially lower at and below 1.67 N. Except at the highest concentration of alkali the temperature never rose above 120° F. Since sodium glucuronate is considerably more soluble in aqueous methanol than is potassium glucuronate, it is advantageous to use as high a concentration of sodium hydroxide as is consistent with tolerable color formation.

We claim:

1. The process of preparing alkali metal salts of glucuronic acid which comprises instantaneously and intimately contacting glucuronolactone and aqueous alkali metal hydroxide, and recovering the resultant salt; the temperature during the resultant reaction not exceeding about 130° F.; the ratio of glucuronolactone to alkali metal hydroxide being 1.0 mole to 0.9–1.0 mole and the concentration of alkali hydroxide being 0.5 to 2.0 moles per liter of hydroxide solution.

2. The process according to claim 1 wherein the resultant solution of the salt of glucuronic acid is decolorized with activated carbon at a temperature not exceeding about 130° F., the carbon removed and thereafter sufficient methanol added to the clarified liquor to produce a concentration of methanol representing 20 to 55 per cent by volume of the liquor, and the resultant crystalline salt of glucuronic acid recovered.

3. The process of preparing potassium glucuronate dihydrate which comprises instantaneously and intimately contacting glucuronolactone and potassium hydroxide in the molar ratio of 1.0 to 0.9–1.0, the concentration of potassium hydroxide being 1 N, the temperature of the resultant reaction being in the range of about 70 to 90° F., decolorizing the resultant solution with activated carbon at a temperature not exceeding 130° F., removing the carbon, adding 20 to 40 per cent on a volume basis of methanol, and recovering the resultant crystalline potassium glucuronate dihydrate.

4. The process of preparing sodium glucuronate monohydrate which comprises instantaneously and intimately contacting glucuronolactone and sodium hydroxide in the molar ratio of 1.0 to 0.9–1.0, the concentration of sodium hydroxide being 1.7 N, the temperature during the resultant reaction being about 70 to 90° F., decolorizing the resultant solution with activated carbon, removing the carbon, adding 35 to 55 on a volume basis of methanol, and recovering the resultant crystalline sodium glucuronate monohydrate.

References Cited in the file of this patent

UNITED STATES PATENTS

| Number | Name | Date |
|---|---|---|
| 2,520,255 | Peterman | Aug. 29, 1950 |
| 2,562,200 | Mehltretter | July 31, 1951 |
| 2,583,534 | Mast | Jan. 29, 1952 |